United States Patent
Oyama et al.

(10) Patent No.: US 7,545,743 B2
(45) Date of Patent: Jun. 9, 2009

(54) P2P TRAFFIC SUPPORTING ROUTER AND P2P TRAFFIC INFORMATION SHARING SYSTEM USING THE ROUTER

(75) Inventors: Takuji Oyama, Kawasaki (JP); Masatoshi Kumagai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 698 days.

(21) Appl. No.: 10/939,188

(22) Filed: Sep. 10, 2004

(65) Prior Publication Data
US 2005/0226216 A1 Oct. 13, 2005

(30) Foreign Application Priority Data
Apr. 5, 2004 (JP) .............................. 2004-111350

(51) Int. Cl.
*H04J 1/16* (2006.01)
(52) U.S. Cl. .................... 370/230.1; 370/229; 370/235; 370/400
(58) Field of Classification Search ......... 370/229–235, 370/412–429
See application file for complete search history.

(56) References Cited

U.S. PATENT DOCUMENTS

| | | | | |
|---|---|---|---|---|
| 6,914,883 | B2 * | 7/2005 | Dharanikota | 370/230.1 |
| 7,088,710 | B1 * | 8/2006 | Johnson et al. | 370/357 |
| 2005/0141426 | A1 * | 6/2005 | Hou | 370/235 |
| 2006/0253622 | A1 * | 11/2006 | Wiemann et al. | 710/52 |

FOREIGN PATENT DOCUMENTS

| | | |
|---|---|---|
| JP | 2003-092593 | 3/2003 |
| JP | A-2003-067276 | 3/2003 |
| JP | 2003-198613 | 7/2003 |

OTHER PUBLICATIONS

Notifice of Reason(s) for Rejection dated Jan. 27, 2009, for the corresponding Japanes Application 2004-111350.
Toshimichi Suematsu, et al., "A prosposal and evaluations of marking scheme in diffserv", IEICE Technical Report, Feb. 26, 2004, pp. 93-96, vol. 103, Japan.
Yoshiki Shimotsuma, et al., "A study of congestion control in P2P computing model", Proceedings of the 2001 Communications Society Conference of IEICE, Sep. 18-21, p. 91, 2001, Japan.

* cited by examiner

*Primary Examiner*—Phuc H Tran
(74) *Attorney, Agent, or Firm*—Katten Muchin Rosenman LLP

(57) ABSTRACT

A router particularly providing a P2P traffic supporting router which discriminates and effectively controls P2P (Peer to Peer) traffic transmitted in a network. The router comprises a router part to execute a router function, a discrimination part to discriminate P2P traffic from input traffic, an assignment part to assign discrimination information to the P2P traffic discriminated in the traffic discrimination part, a notification part to create notification information to notify the discrimination information to other routers, and a controller to control the discriminated P2P traffic, wherein the router part outputs the notification information according to directions from the notification part and outputs P2P traffic containing the discrimination information according to directions from the controller.

8 Claims, 13 Drawing Sheets

Fig.6

| VERSION (4bits) | IHL (4bits) | TYPE OF SERVICE (8bits) | TOTAL LENGTH (16bits) | |
|---|---|---|---|---|
| IDENTIFICATION (16bits) | | | FLAGS (3bits) | FRAGMENT OFFSET (13bits) |
| TIME OF LIVE (8bits) | | PROTOCOL (8bits) | HEADER CHECKSUM (16bits) | |
| SOURCE ADDRESS (32bits) | | | | |
| DESTINATION ADDESS (32bits) | | | | |
| OPTION (VARIABLE LENGTH) | | | | PADDING (VARIABLE LENGTH) |

Fig.8

| DETERMINATION INFORMATION | DETERMINATION INFORMATION SOURCE | SOURCE ADDRESS | DESTINATION ADDRESS | SOURCE PORT | DESTINATION PORT | PRIORITY | ENTRY CREATING TIME |
|---|---|---|---|---|---|---|---|
| ×△○◇ | x.x.x.x | x.x.x.x | x.x.x.x | ○ | × | b | aa:bb:cc |
| ⋮ | | | | | | | |
| △○◆◎ | x.x.x.x | x.x.x.x | x.x.x.x | ◎ | △ | a | dd:ee::ff |

P2P TRAFFIC SUPPORTING ROUTER AND P2P TRAFFIC INFORMATION SHARING SYSTEM USING THE ROUTER

This application hereby claims priority under 35 U.S.C. 119 from Japanese patent application No. 2004-111350 filed Apr. 5, 2004, which is herein incorporated by reference.

BACKGROUND OF THE INVENTION

1. Field of the Invention

The present invention relates to a router, and particularly relates to a router which identifies and controls P2P (Peer to Peer) traffic transmitted in networks and a P2P traffic information sharing system using the router.

2. Description of the Related Art

As the broad-band Internet has become popular, various P2P applications to exchange files through the Internet among the end users have appeared. A P2P application is file exchange software which enables the exchange of files, among client PCs, directly through the Internet.

For example, there is a P2P application specialized in specific files or a P2P application to enable exchange of any file without setting a server for file searching or file exchanging on the Internet (see Reference 1). The P2P application enables electronic commerce through the Internet with a third party in an individual level and also enables direct exchange of a large file, e.g., a music data file, etc., among individuals who can access the Internet.

Reference 1: Japanese Unexamined Patent Publication No. 2003-67276

However, at present, P2P traffic using the P2P application occupies a large part of the network bandwidth provided by a service provider (ISP) and consequently, use of other web services is restricted. This is because P2P traffic is generally used for a data transmission of a large file such as a music data.

FIG. 1 shows a comparative example of the P2P traffic and the traffic of other web services or the like.

As shown in FIG. 1, the P2P traffic occupies 70% to 80% of the network bandwidth provided by the service provider, and common Internet applications such as web browsing, and e-mail use only the remaining 20% to 30%.

Accordingly, P2P causes a congestion in the network and this brings about a degradation of the service quality of the entire network provided by the Internet provider. Moreover, this causes a problem that an equitable service cannot be provided to those who use P2P applications and those who do not use P2P applications.

In order to eliminate the above problems, the service provider arranges network devices to control the P2P traffic appropriately depending on the traffic volume. The network device must analyze the packet data of upper layers to determine the P2P traffic, therefore, network devices for P2P which can determine P2P traffic have been used.

Because the network device used for P2P requires more processes to discriminate the P2P traffic than the prior router, its data transmission ability is too small to use as a core in a large scale network. Therefore, the network devices have been used only at specific points in the network, corresponding to data transmission processability. In order to effectively control P2P traffic in the entire network, it is necessary to provide network devices for P2P, corresponding to the respective traffic capacities, at all the required points in the network.

FIG. 2 shows an example of a known P2P traffic control.

In FIG. 2, edge routers 31 and 34, having a function as a network device intended to use for P2P in addition to a function as a router, are placed at reception points in subscriber's terminals 21 to 24.

In practice, the network devices specialized in the P2P are arranged together with the edge routers 31 and 34 having only a router function at the reception points, together with the network devices specialized in the P2P control the P2P traffic. On the other hand, routers 32, 33 and 35 in a network 11 with a large amount of traffic only have a function as a router.

In the present embodiment, only the edge routers 31 and 34 determine the kind of the data stream from subscriber's terminals 21 to 24 and discriminate the traffic using P2P application (P2P traffic) from the other traffic (Non-P2P traffic). The discriminated p2P traffic is, for example, limited in its transmission bandwidth or is discarded if necessary.

Consequently, the amount of the P2P traffic flowing from the edge routers 31 and 34 into the network 11 is limited whereby congestion in the network 11 due to the P2P traffic is prevented.

However, even if each P2P traffic flow into the network 11 is restricted in the edge routers 31 and 34, they are eventually joined in the network 11 when they are sent to an outside network 12. In this embodiment, the P2P traffic is joined in a router 33 in the network 11 and the joined traffic is sent to the network 12 via an edge router 35 provided at a peering point.

In this case, the traffic, which is increased due to joining, causes congestion between the router 33 and the edge router 35, and as a result, the P2P traffic control using the edge routers 31 and 34 does not work effectively. To avoid this, not only the edge routers 31 and 34 but all the routers 31 to 35 in the network 11 are required to have a function of a P2P-specialized network device or to be provided with the same. However, in this case, the data transmission processability is reduced due to the P2P traffic control in the routers 32, 33 and 35 in which the amount of the traffic in the network 11 is large.

SUMMARY OF THE INVENTION

The present invention is intended to provide a P2P traffic supporting router and a P2P traffic information sharing system using the router which can discriminate P2P traffic without additionally providing a network device exclusive for P2P and can control P21P traffic in a network without reducing the transmission processability.

According to the present invention, there is provided a router comprised of a router part to perform a router function, a discrimination part to discriminate P2P traffic from input traffic, an assignment part to assign identification information to the P2P traffic discriminated in the traffic discrimination part, a notification part to create notifying information to notify the discrimination information to other routers, and a controller to control the discriminated P2P traffic, wherein the router part outputs the notifying information according to directions from the notification part and outputs P2P traffic including the discrimination information according to directions from the notification part.

According to the present invention, there is provided a router comprising
   a router part to execute a router function, a table to store discrimination information of P2P traffic notified from other router, a determination part to determine that when the discrimination information of the P2P traffic contained in input traffic and discrimination information stored in the table are compared and identical to each other, the traffic is P2P traffic, and a controller to control the P2P traffic, the router part outputting P2P traffic containing the discrimination information according to directions from the controller.

According to the present invention, there is further provided a P2P traffic information sharing system structured as a network comprising the above two kinds of router.

According to the present invention, if some of the routers can discriminate P2P traffic, the other routers can co-work with the first routers so that P2P traffic can be controlled in the entirety of the network.

According to the present invention, the some of the routers are placed at a reception point of subscriber's terminals or the like where the traffic is comparatively light, and therefore, the P2P traffic discrimination can be processed without lowering its router function.

According to the present invention, each of the routers inside the network controls P2P traffic using mainly an existing router function, so that much traffic can be processed without lowering a data transmission processability as a router.

BRIEF DESCRIPTION OF THE DRAWINGS

The present invention will be more clearly understood from the description as set forth below with reference to the accompanying drawings.

FIG. 6 shows an example of a packet format.

FIG. 8 shows an example of a P2P discrimination information table of FIG. 7.

DESCRIPTION OF THE PREFERRED EMBODIMENTS

Figure 3:
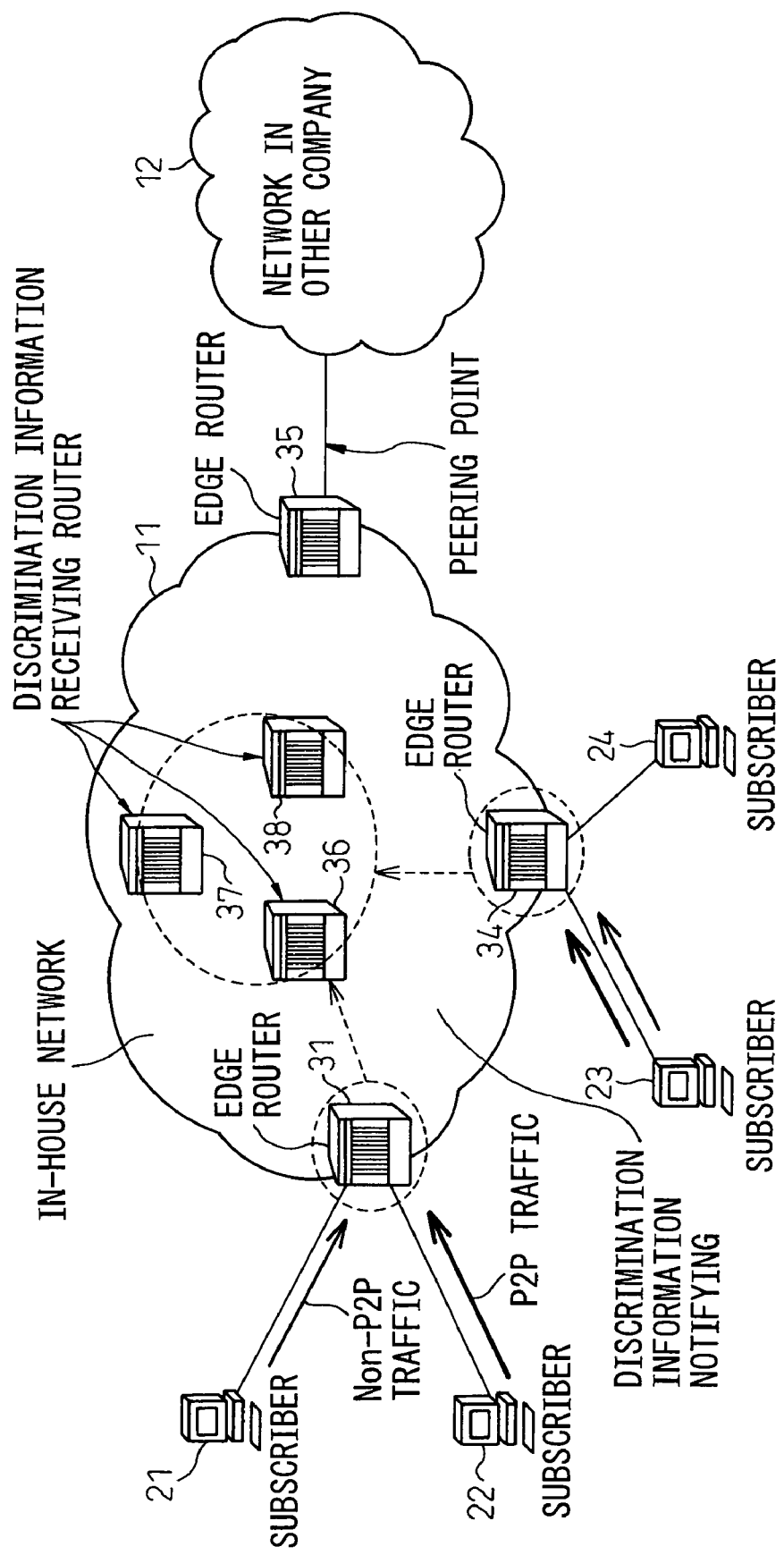
FIG. 3 is a diagram showing an embodiment of a P2P traffic information sharing system according to the present invention.

FIG. 3 is a diagram showing a structure of a P2P traffic information sharing system, according to the present invention, by way of example.

Figure 1:
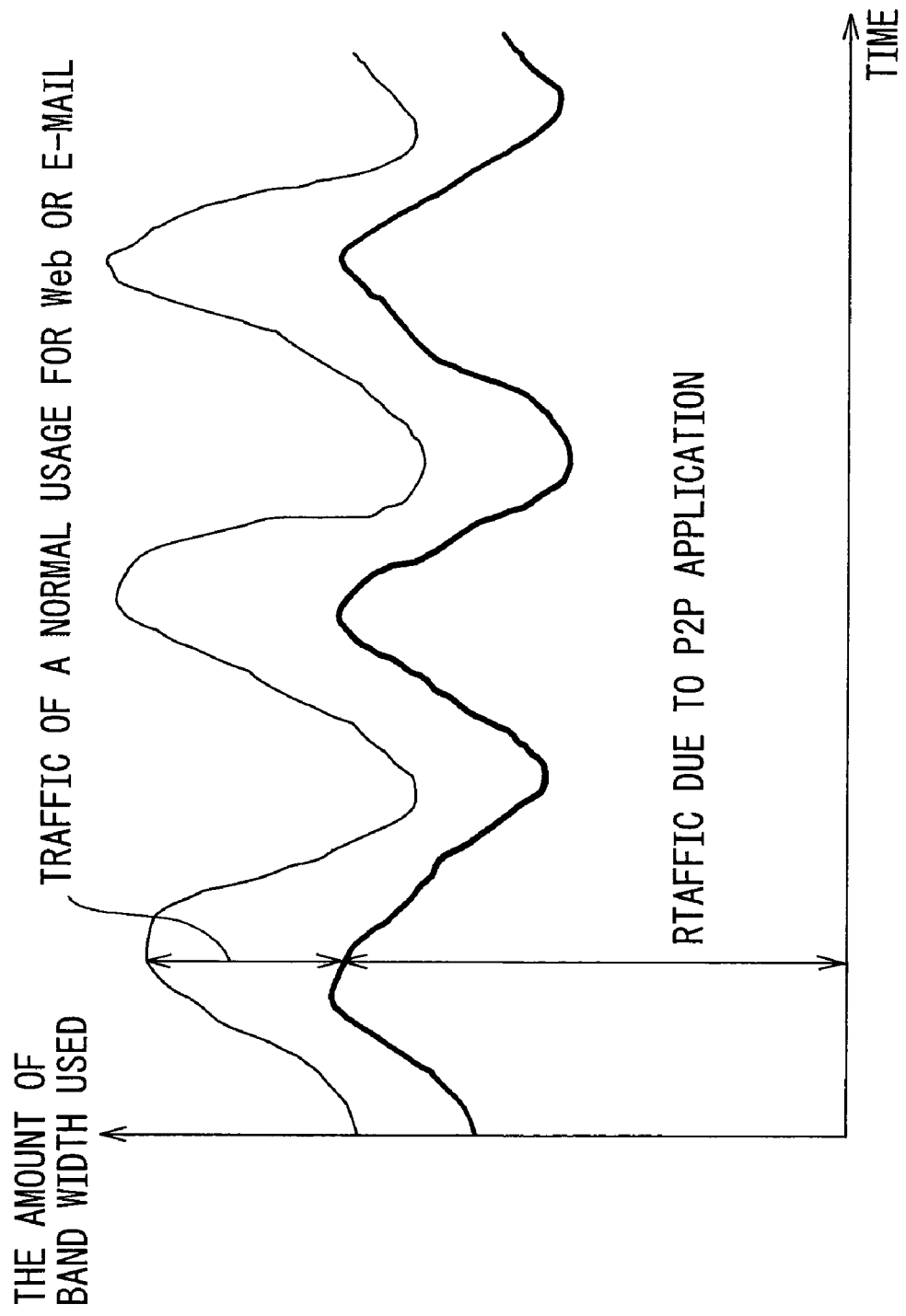
FIG. 1 shows a comparative example of P2P traffic and another traffic.
Figure 2:
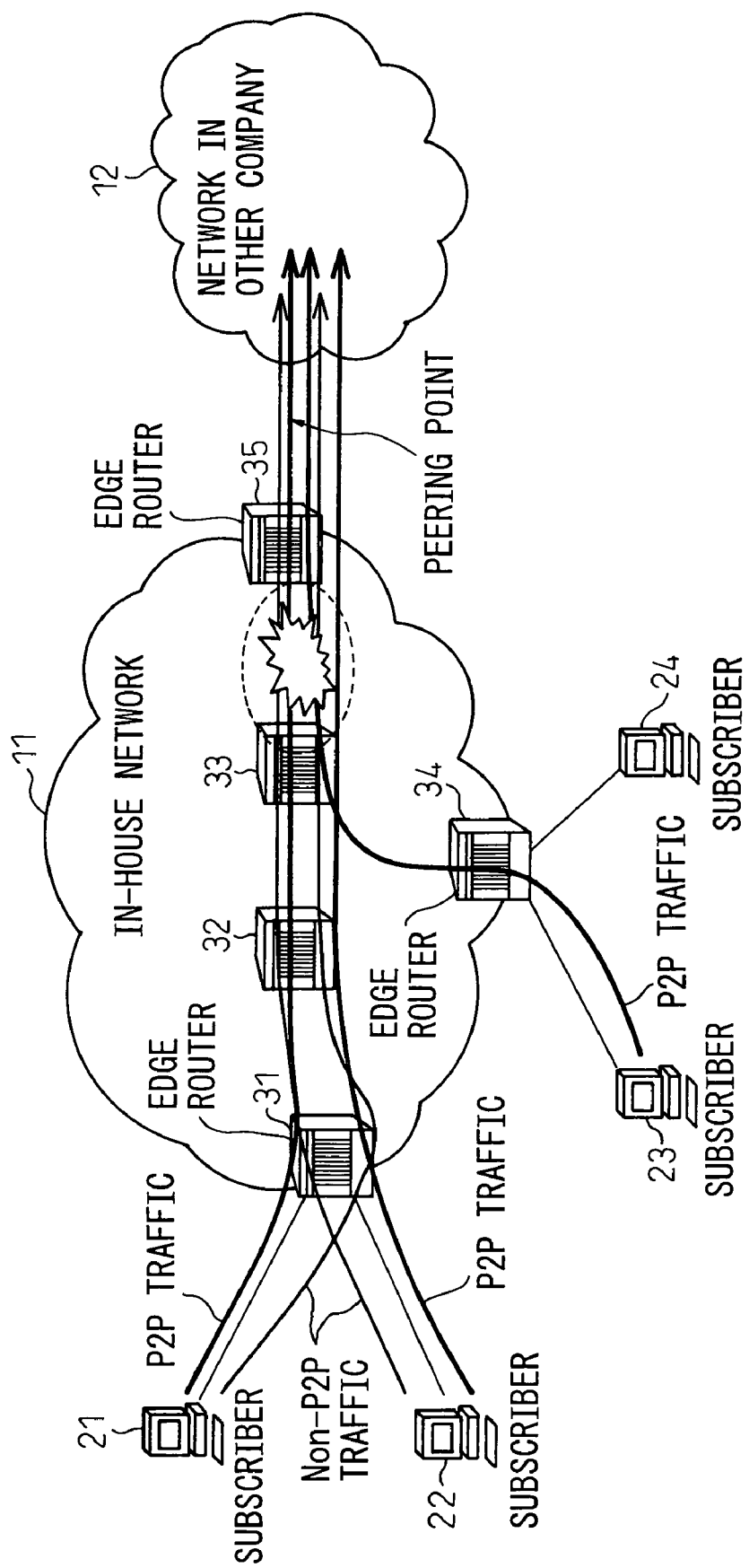
FIG. 2 is a diagram showing an example of a prior P2P traffic control.

The system structure of FIG. 3 is basically the same as a aforementioned structure shown in FIG. 2, and the same numerals are given to object identical to each other, and they will not be explained.

Hereinafter, a P2P traffic discriminatable router (edge routers 31 and 34 in the drawing), which is one of the significant features of the present invention, and a P2P discrimination information receiving router (internal routers 36 to 38 in the drawing) will be explained. All the routers 31 and 34 to 38 can be equipped with a P2P discrimination information receiving function.

Figure 4:
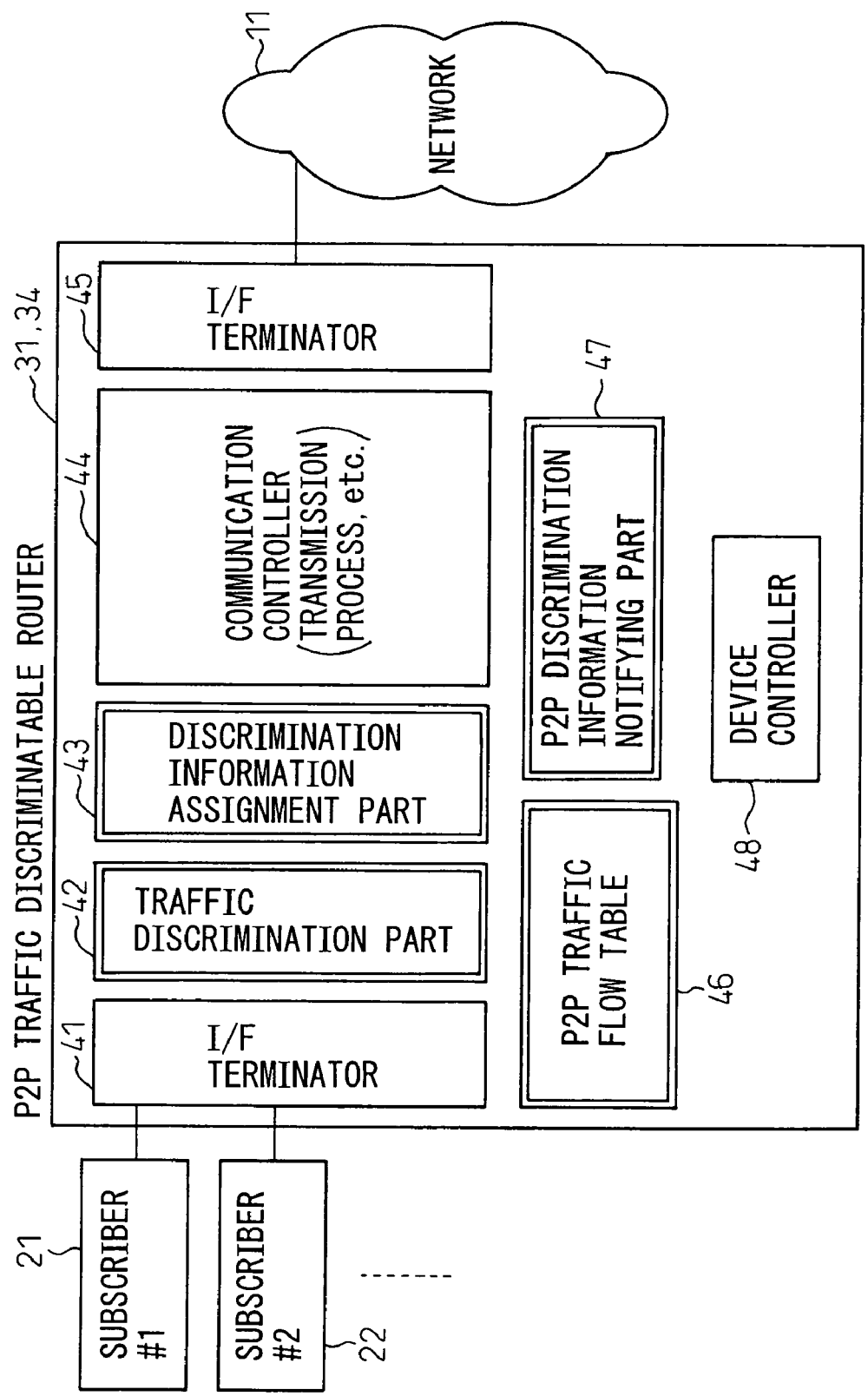
FIG. 4 shows a basic structure of a router which can discriminate P2P traffic.
Figure 5:
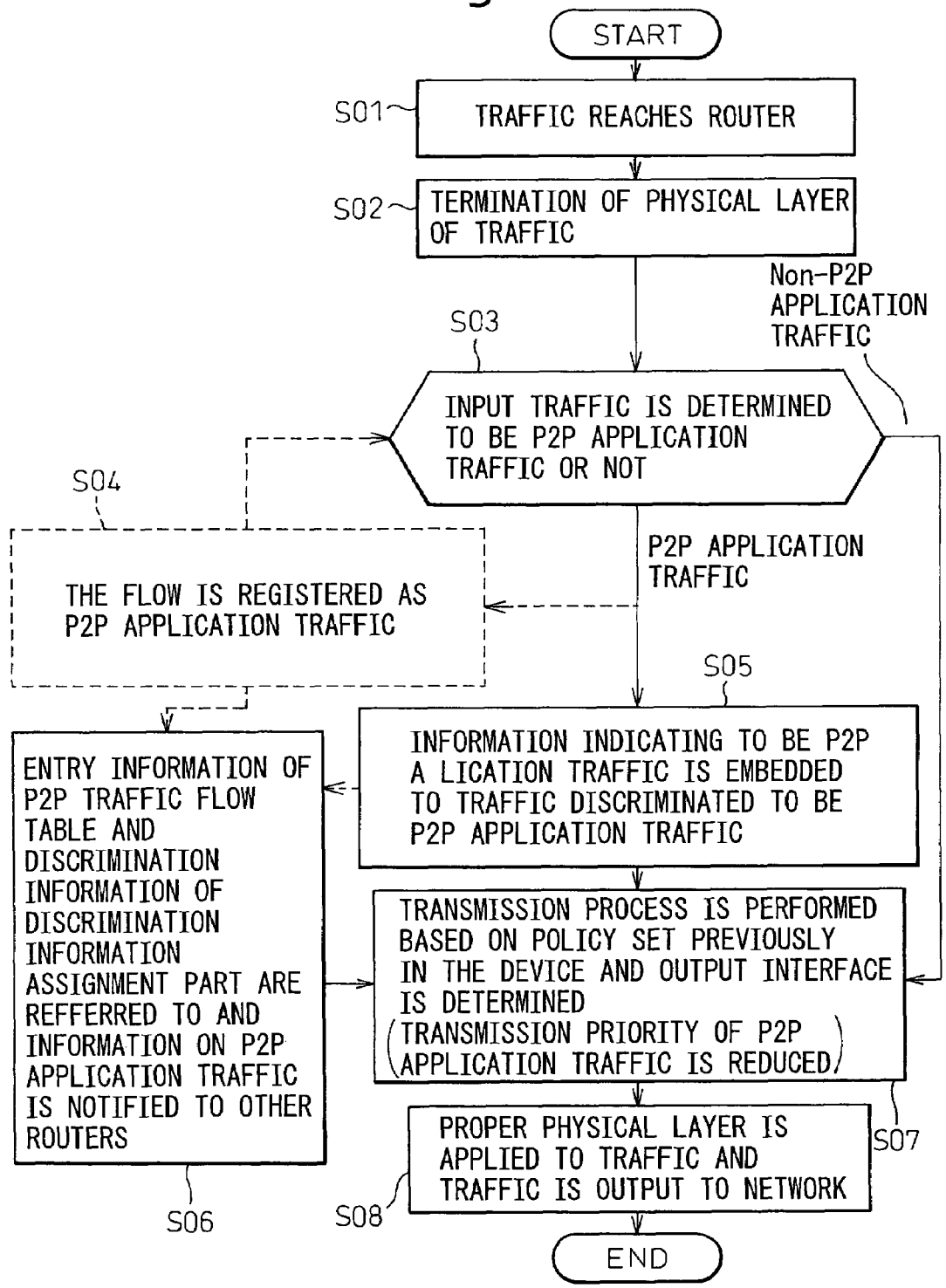
FIG. 5 shows an example of an operation flow of FIG. 4.

FIG. 4 shows a basic structure of a P2P traffic discriminatable router. FIG. 5 shows an example of an operation flow of FIG. 4.

The P2P traffic discriminatable router corresponds to the edge routers 31 and 34 in FIG. 3 and is provided at a terminal containing point of a provider subscriber where the traffic is comparatively light because not only the original router function but also P2P traffic discriminating process are carried out. In FIG. 4, blocks 42, 43, 46 and 47 relating to the operation of the present invention are clearly indicated by double frames. In FIG. 5, the flow of the traffic is shown as a solid line arrow and the flow of discrimination information is shown as a broken line arrow.

In FIG. 4, the traffic from the subscribers terminal 21 and 22 is terminated in a termination 41 (S01 and S02), and the kind of the traffic is identified in a traffic discrimination part 42 (S03). The traffic discrimination part 42 performs classifying operations for every traffic flow and if the flow of a traffic is classified into P2P traffic, the flow information is registered in a P2P traffic flow table 46 (S04).

To discriminate the P2P traffic, an upper layer of a received packet data can be analyzed, a communication sequence specific to a P2P communication can be detected, traffic volume which tends to be heavy for P2P traffic can be detected, or a combination thereof can be used.

Next, an assignment part 43 assigns discrimination information to each packet of the P2P traffic to show that the packet is for the P2P traffic (S05), with reference to the flow information registered in the P2P traffic flow table 46. This discrimination information includes details of P2P traffic process (for example, transmission priority). This discriminative information may be registered with the corresponding flow information in the P2P traffic flow table 46.

The P2P discrimination information notification part 47 refers to the flow information registered in the P2P traffic flow table 46 and obtains the corresponding discrimination information therefrom or from the discrimination information assignment part 43. Next, a discrimination information notifying packet including the discrimination information is created (S06), and is sent to the internal routers 36 to 38 in the network 11 via a communication controller 44 and an interface termination 45.

FIG. 6 shows a typical packet format. For example, the discrimination information is put in the "Type of Service (8 bits)" field. In this case, the internal routers 36 to 38 can receive the discrimination information notifying packet by an existing packet transmission process and no particular process therefor is necessary. A particular communication protocol may be used for this notification and receipt.

The communication controller 44 determines each output interface for the Non-P2P traffic packet from the traffic discrimination part 42, the P2P packet from the discrimination information assignment part 43, or the discrimination information notifying packet from the P2P discrimination information notifying part 47, based on a predetermined policy (regarding the transmission priority or discard priority for each packet type or the like) and a routing table (not shown), and sends the packets into the network 11 via the interface termination 45 (S07 and S08). The predetermined policy is given by a device controller 48.

In the present example, the P2P traffic discriminatable routers 31 and 37 are provided at reception points of subscriber's terminals in which the amount of the traffic is comparatively light, and therefore, a processing load to discriminate the P2P traffic hardly affect the data transmission processability as a router. The P2P traffic discriminatable router works together with P2P discrimination information receiving router, which will be discussed hereinafter to thereby control the P2P traffic in the network 11 appropriately, and achieves an effective data transmission in the entire of the network 11.

Figure 7:
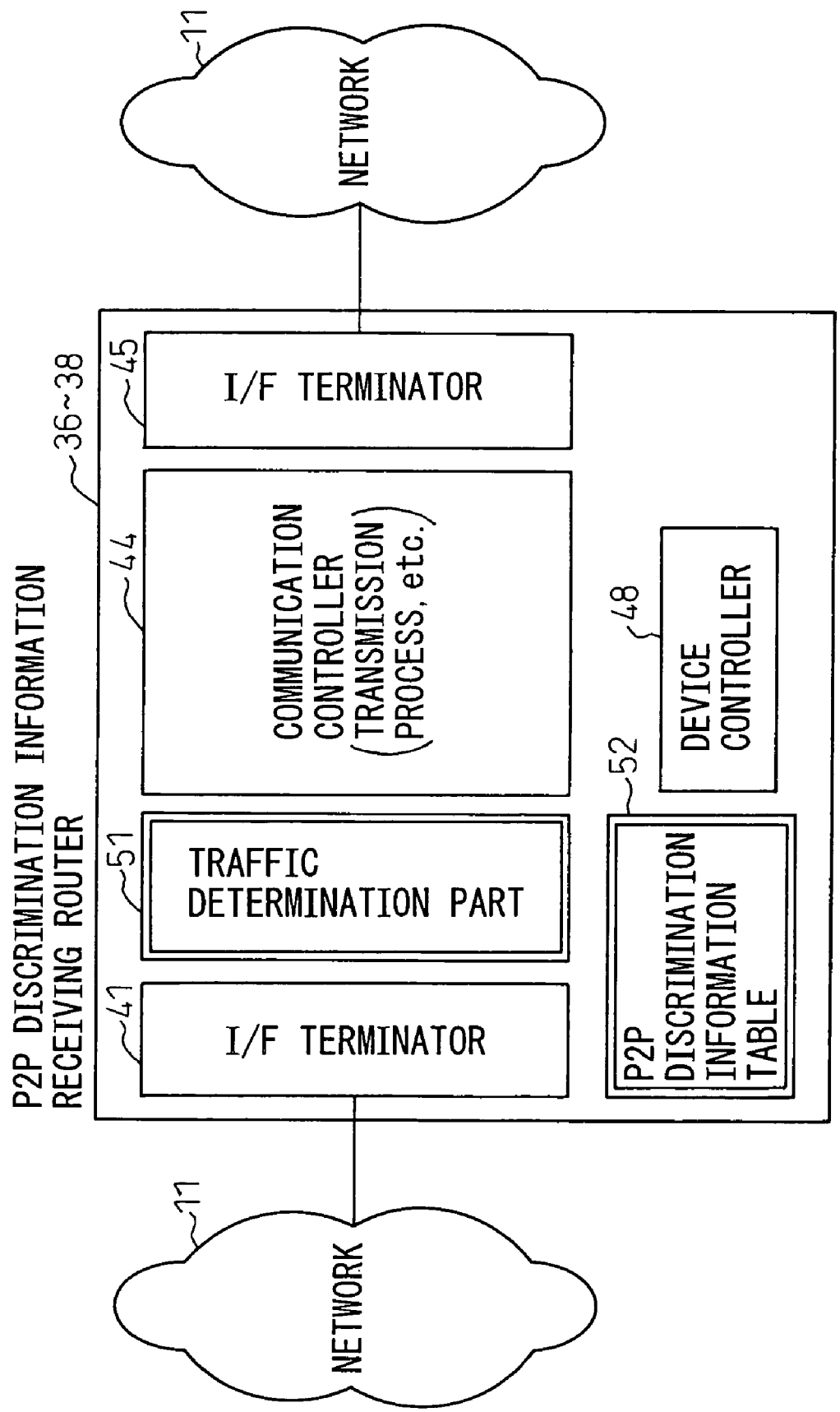
FIG. 7 shows a basic structure of a P2P discrimination information receiving router.
Figure 9:
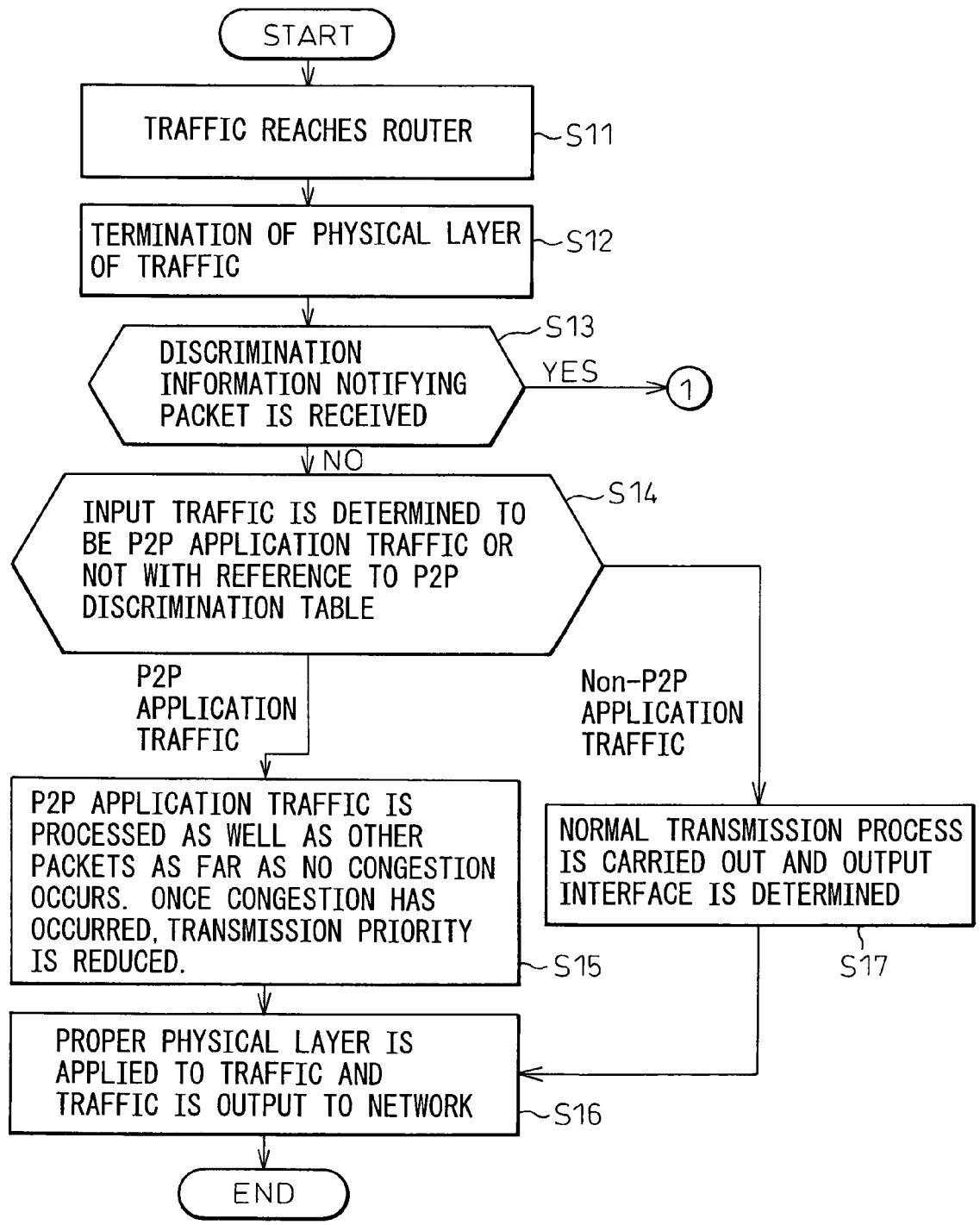
FIG. 9 shows an example (1) of an operation flow of FIG. 7.
Figure 10:
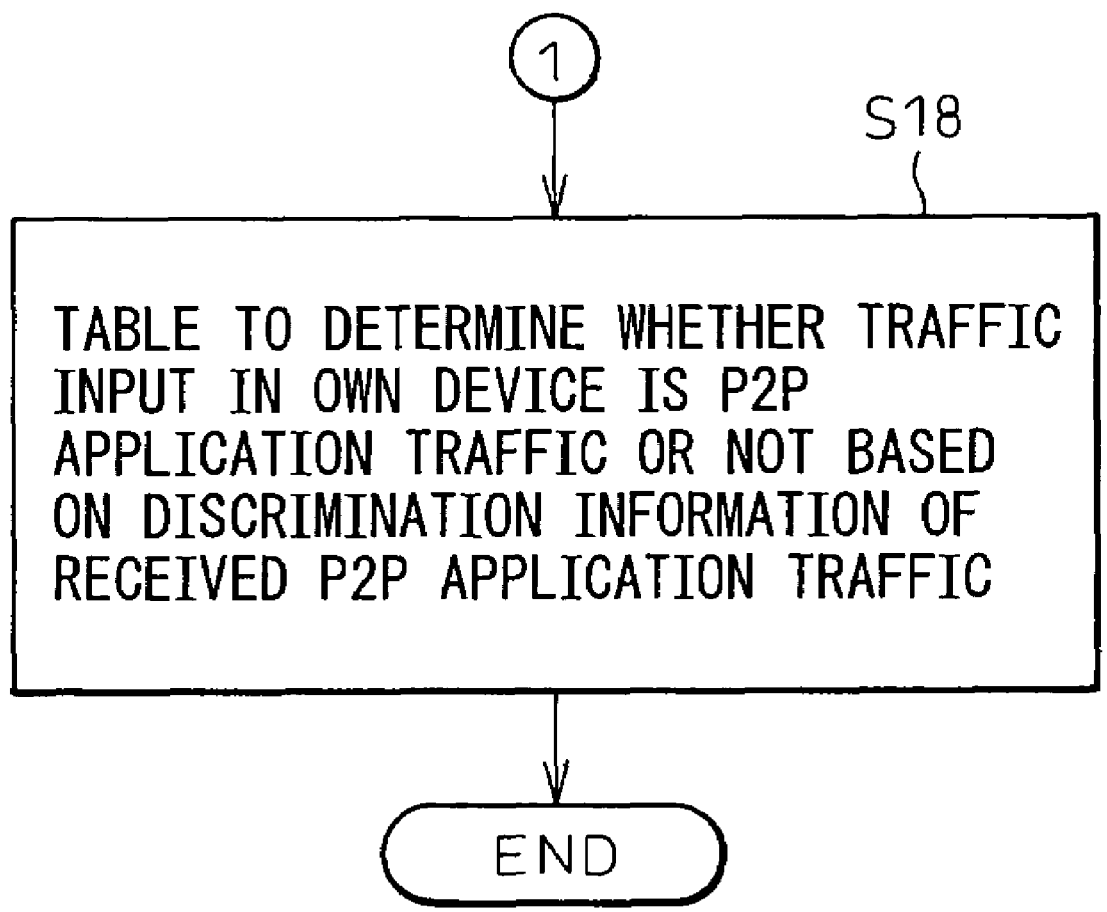
FIG. 10 shows an example (2) of an operation flow of FIG. 7.

FIG. 7 shows the basic structure of the P2P discrimination information receiving router. FIG. 8 shows an example of a P2P discrimination information table 52 and FIG. 9 shows an example of an operation flow in FIG. 7.

The P2P discrimination information receiving router corresponds to the internal routers 36 to 38 and executes inherent router functions, except for an additional simple process for determination of the traffic type and, therefore, the packet transmission process cannot be interrupted in the network 11 where the traffic is heavy.

In FIG. 7, the traffic determination part 51 and the P2P discrimination information table 52, which especially relate to operations according to the present invention are indicated by double frames, and the following discussion will be mainly addressed to these components. The other components are identical to those corresponding in FIG. 4.

In FIG. 7, the traffic from the P2P traffic discriminatable router is terminated in the interface termination 41 (S11 and S12) and its traffic type is determined in the traffic determination part 51. In this step, first, it is determined whether the received traffic packet is a discrimination information notifying packet or not (S13). If the packet is the discrimination information notifying packet, the notification content is added to a new entry in the P2P discrimination information table 52 or existing corresponding entry is updated (S18).

On the other hand, if the packet is not the discrimination information notifying packet, it is determined whether the received traffic is P2P traffic or not with reference to the P2P discrimination information table 52 (S14).

FIG. 8 shows an example of the P2P discrimination information table 52. Other identification information such as a predetermined label applied at a predetermined position of packet data may be used.

As described above, the received discrimination information notifying packet includes not only determination information for each packet of the P2P traffic but also processing details of the packet. An IP address of the P2P traffic discriminatable router 31 or 34, a source of the discrimination information, an IP address and a port number of the source subscriber's terminal, an IP address and a port number of the destination subscriber's terminal, transmission priority of the received P2P traffic, and a time stamp when the corresponding entry is made, are registered in the P2P discrimination information table 52 in FIG. 8.

In the traffic determination part 51, the P2P discrimination information table 52 is referred to. If discrimination information corresponding to discrimination information added to the received packet from the table is detected, it is immediately determined that the discrimination information is P2P traffic (S14), without analyzing the packet data of the upper layer as in the prior art. Usually the data transmission process is executed without a particular restriction, as in the non-P2P traffic. If a congestion state is detected, the data transmission priority of the P2P traffic is reduced (S15), according to the priority in the table (See FIG. 8).

On the other hand, if the traffic determination part 51 detects no discrimination information corresponding to the discrimination information added to the received packet, even with reference to the P2P discrimination information table 52, the traffic is determined to be non-P2P traffic, and the output interface is determined by a normal process (S17). Both the P2P traffic and the non-P2P traffic are sent into the network 11 via the interface termination 45 under control of the communication controller 44 (S16).

As described above, the load for determining the P2P traffic in the P2P discrimination information receiving router is remarkably small and, hence, the same data transmission capability as that of the existing router can be achieved. Moreover, the P2P traffic in the network 11 can be appropriately controlled so that a very effective data transmission can be achieved in an entire network.

Figure 11:
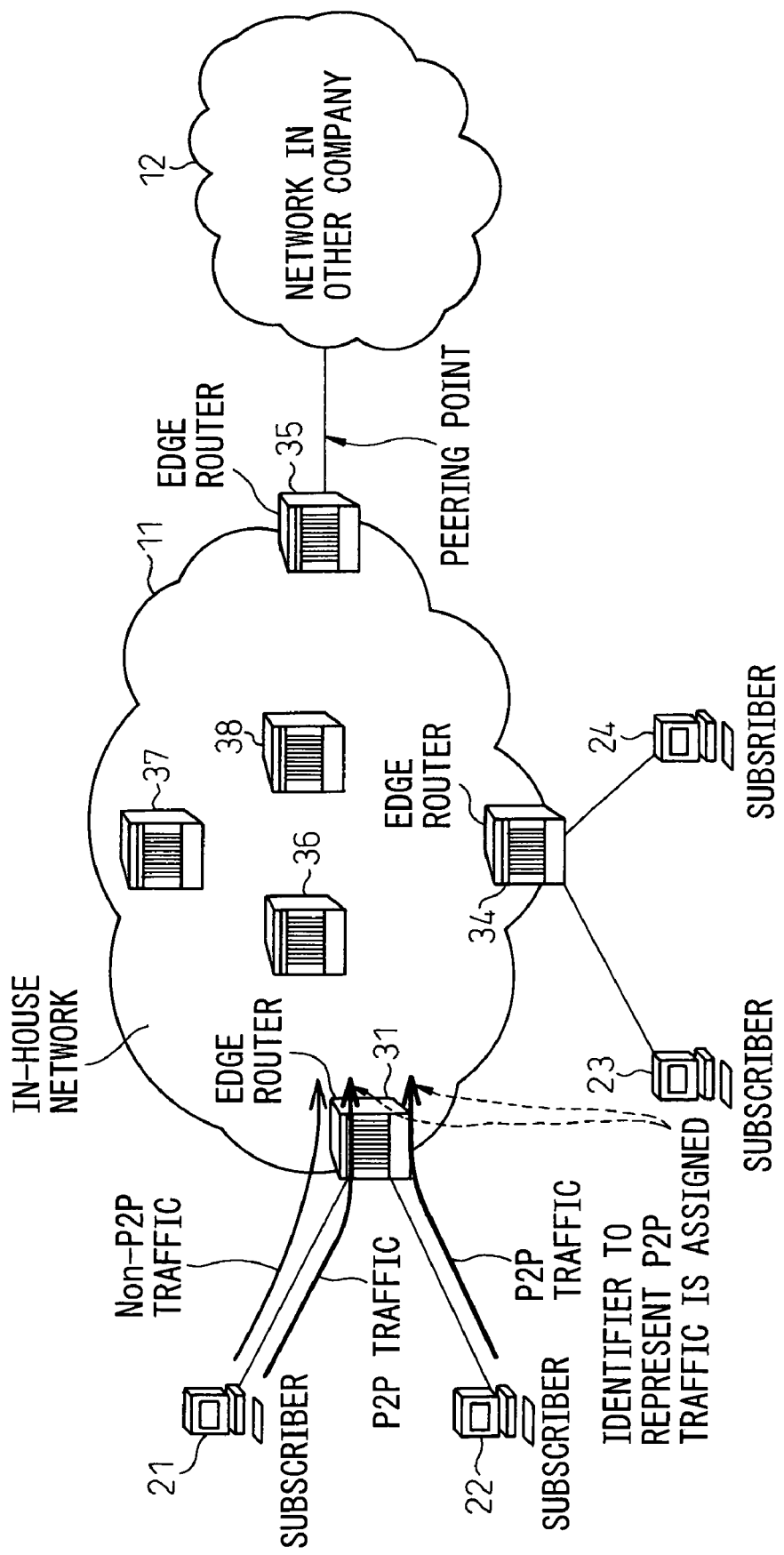
FIG. 11 is a diagram showing an operation (1) of a P2P traffic information sharing system according to the present invention.
Figure 12:
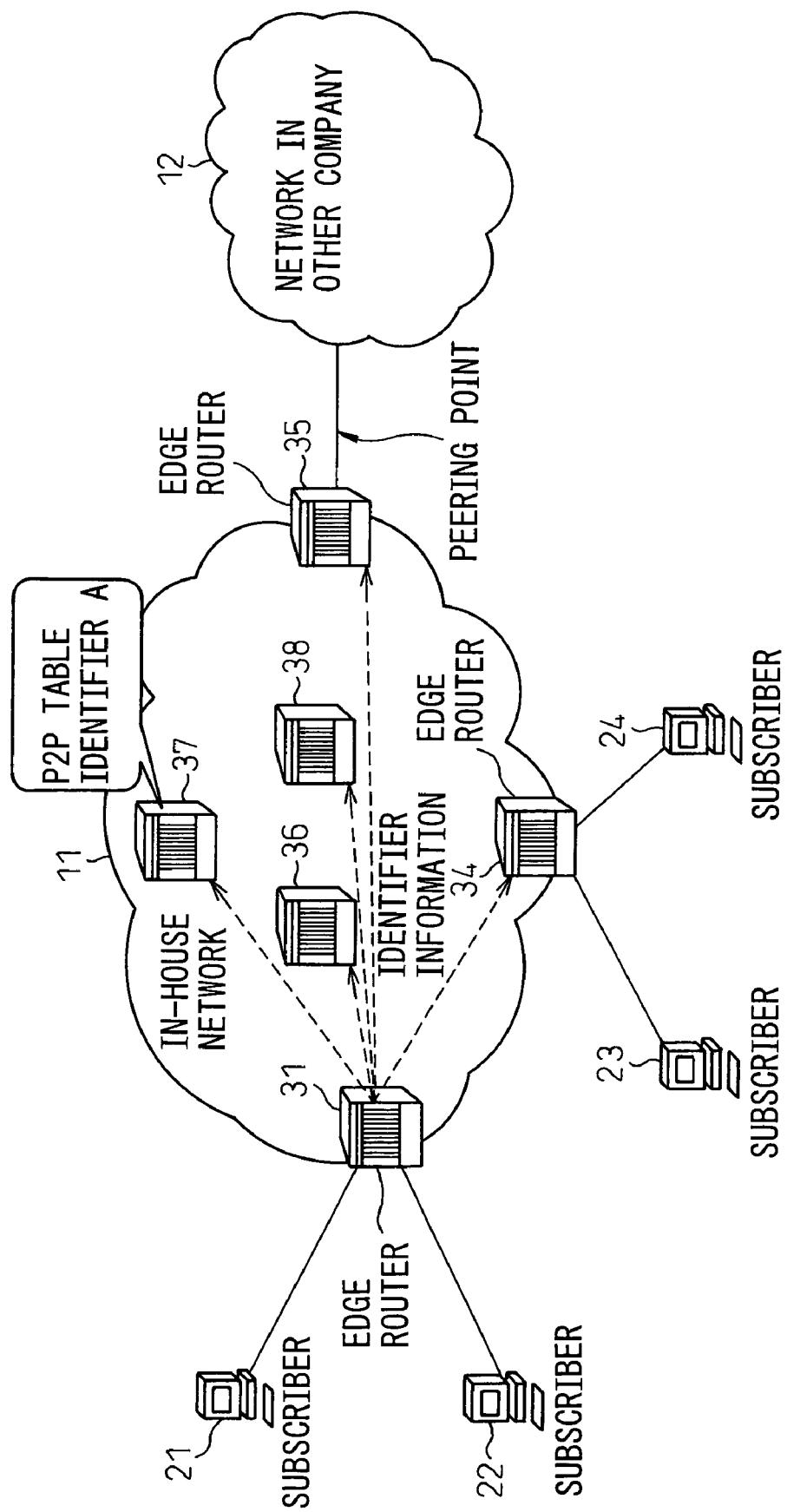
FIG. 12 is a diagram showing an operation (2) of a P2P traffic information sharing system according to the present invention.
Figure 13:
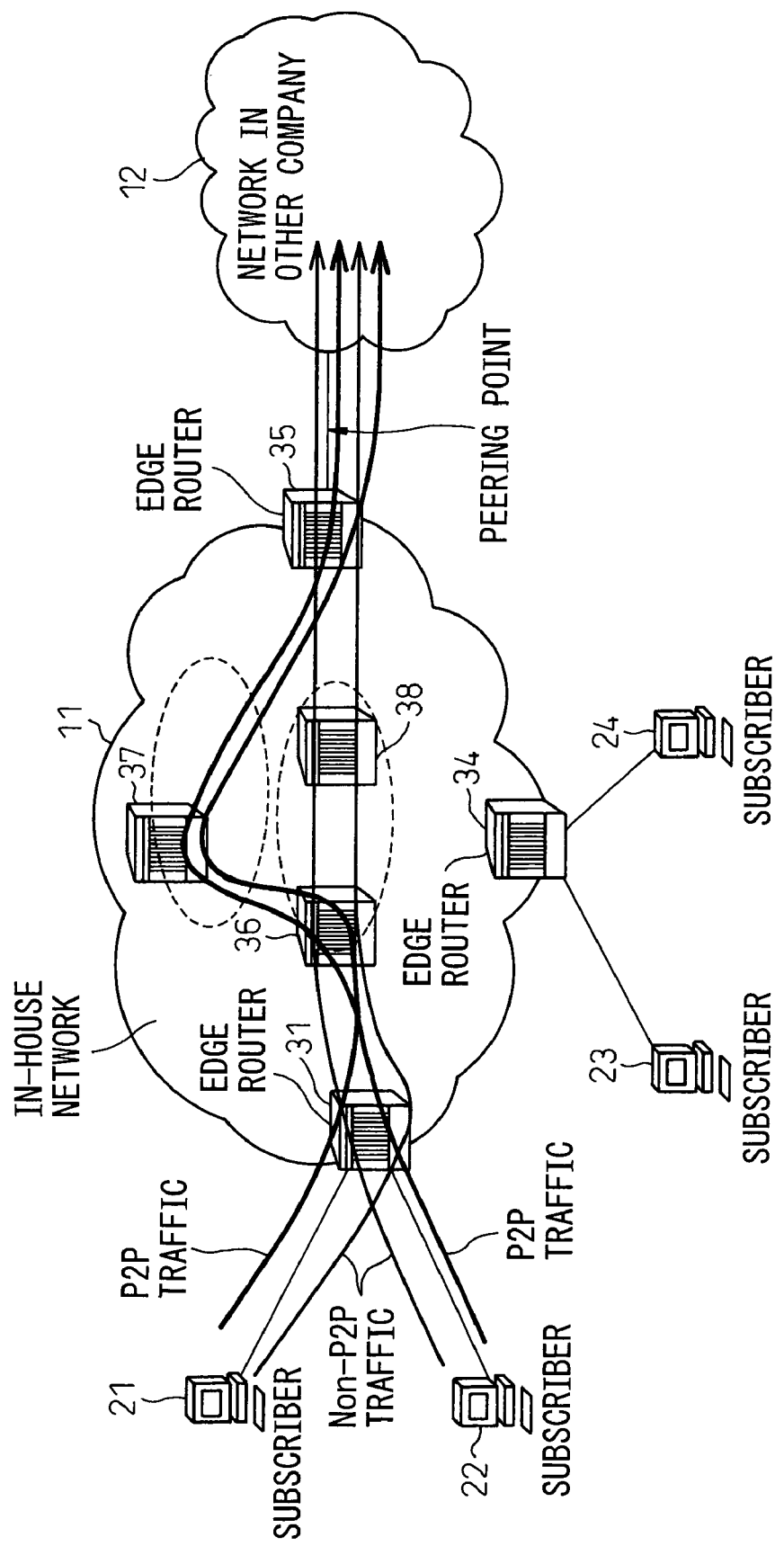
FIG. 13 is a diagram showing an operation (3) of a P2P traffic information sharing system according to the present invention.

FIGS. 11 to 13 illustrate operations of P2P traffic information sharing system using a P2P traffic supporting router according to the present invention. The operation of each of the router is as explained above. Therefore, only the operation of the entirety of the P2P traffic information sharing system will be briefly explained here.

In FIG. 11, non-P2P traffic from the subscriber's terminal 21 and P2P traffic from the subscriber's terminal 22 are input into the P2P traffic discriminatable router 31. In the P2P traffic discriminatable router 31, the traffic discrimination part 42 discriminates the input packet type and only the P2P traffic is registered to the P2P traffic flow table 46. And, the assignment part 43 assigns the discrimination information to the discriminated P2P traffic.

In FIG. 12, the P2P discrimination information notification part 47 in the P2P traffic discriminatable router 31 refers to the P2P traffic flow table 46 and creates a discrimination information notifying packet based on the discrimination information assigned by the assignment part 43. The P2P traffic discriminatable router 31 broadcasts the packet to all the routers in the network 11, to other routers 34, 36 to 38 and 35 including P2P traffic discriminatable router and P2P discrimination information receiving routers.

The P2P discrimination information receiving routers 36 to 38 register the received discrimination information to their P2P discrimination information table 52. The remaining routers, the P2P traffic discriminatable router 34 and the edge router 35 at a peering point, may be also provided with the P2P discrimination information table 52 to register the received discrimination information.

In FIG. 13, the P2P traffic discriminatable router 31 sends both non-P2P traffic and P2P traffic to the P2P discrimination information receiving routers 36 based on its routing table. The P2P discrimination information receiving routers 36 determines the traffic containing the discrimination information to be P2P traffic by comparing it with the discrimination information registered in its P2P discrimination information table 52.

In this example, when the P2P discrimination information receiving router 36 sends the non-P2P traffic and P2P traffic to the adjacent P2P discrimination information receiving router based on its routing table, it also detects a shortage of the band width of the transmission route. Consequently, the P2P discrimination information receiving router 36 refers to the P2P discrimination information table 5 again to obtain the priority for the P2P traffic (FIG. 8).

Consequently, the transmission priority for the P2P traffic is degraded. The non-P2P traffic with high priority is straightforwardly sent to the P2P discrimination information receiving router 38 and the P2P traffic with low priority is sent to a detour via the P2P discrimination information receiving router 37.

After that, the same processes are repeatedly executed in each of the routers 37 to 38 and 35, and finally, both non-P2P traffic and P2P traffic are sent to the external network 12 via the edge router 35 provided at a peering point.

As described above, in a P2P traffic information sharing system according to the present invention, P2P traffic is discriminated by only an edge router in which a traffic is comparatively light, and the other routers only execute a simple determination process of discrimination information. Consequently, the P2P traffic can be properly controlled in the entirety of the network and a decrease of data transmission processability of the network can be prevented.

What is claimed is:

1. A router comprising:

a router part to execute a router function;

a discrimination part to discriminate P2P traffic from input traffic;

an assignment part to assign discrimination information to the P2P traffic discriminated in the traffic discrimination part;

a notification part to create notification information to notify the discrimination information to other routers; and a controller to control the discriminated P2P traffic, wherein the router part outputs the notification information according to directions from the notification part and outputs P2P traffic containing the discrimination information according to directions from the controller, and the controller reduces a transmission priority of the P2P traffic in a case of congestion.

2. A router according to claim 1, further comprising a table to store information on the discriminated P2P traffic, wherein the discrimination information notification part creates the notification information corresponding to the stored information, with reference to the table.

3. A router according to claim 1 wherein the discrimination of the P2P traffic and the traffic control after discrimination are carried out for each packet of the P2P traffic.

4. A router comprising:

a router part to execute a router function;

a table to store discrimination information of P2P traffic notified from other router;

a determination part to determine that, when the discrimination information of the P2P traffic contained in input traffic and discrimination information stored in the table are compared and identical to each other, the traffic is P2P traffic; and a controller to control the P2P traffic containing the discrimination information, wherein said router part outputs P2P traffic containing the discrimination information according to directions from the controller, and the controller reduces a transmission priority the P2P traffic in case of congestion.

5. A router according to claim 4, wherein the table contains traffic control information for each of the P2P traffic in addition to the discrimination information, and the controller controls the P2P traffic containing the discrimination information according to the traffic control information.

6. A router according to claim 4 wherein the discrimination of the P2P traffic and the traffic control after discrimination are carried out for each packet of the P2P traffic.

7. A P2P traffic information sharing system structured by a network comprising a router according to claim 1.

8. A P2P traffic information sharing system according to claim 7, wherein the router is arranged at an edge portion terminating a subscriber's terminal of the network.

* * * * *